United States Patent
Lewis et al.

(10) Patent No.: US 11,425,215 B1
(45) Date of Patent: Aug. 23, 2022

(54) METHODS AND SYSTEMS FOR VIRTUAL ASSISTANT ROUTING

(71) Applicant: UIPCO, LLC, San Antonio, TX (US)

(72) Inventors: Olvin Brett Lewis, New Braunfels, TX (US); Justin Leggett, Bulverde, TX (US); Guy R. Langley, San Antonio, TX (US); Andrew Jamison, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/111,808

(22) Filed: Aug. 24, 2018

Related U.S. Application Data

(60) Provisional application No. 62/549,875, filed on Aug. 24, 2017.

(51) Int. Cl.

| G06F 15/16 | (2006.01) |
|---|---|
| H04L 67/63 | (2022.01) |
| G06F 9/48 | (2006.01) |
| H04M 3/527 | (2006.01) |
| G10L 15/22 | (2006.01) |
| G06F 16/9032 | (2019.01) |
| G06F 40/30 | (2020.01) |

(52) U.S. Cl.
CPC .......... *H04L 67/327* (2013.01); *G06F 9/4881* (2013.01); *G06F 16/90332* (2019.01); *G06F 40/30* (2020.01); *G10L 15/22* (2013.01); *H04M 3/527* (2013.01); *G10L 2015/223* (2013.01)

(58) Field of Classification Search
CPC ............ H04L 67/327; G06F 16/90332; G06F 17/2785; G06F 9/4881; G10L 15/22; G10L 2015/223; H04M 3/527
See application file for complete search history.

(56) References Cited

U.S. PATENT DOCUMENTS

| 9,307,080 B1 * | 4/2016 | Fernandez | H04M 3/367 |
| 10,891,629 B1 * | 1/2021 | Barakat | H04M 3/493 |
| 2014/0164476 A1 * | 6/2014 | Thomson | G06Q 10/101 709/203 |
| 2016/0269508 A1 * | 9/2016 | Sharma | H04L 51/18 |
| 2017/0111505 A1 * | 4/2017 | McGann | H04M 3/5235 |
| 2019/0028587 A1 * | 1/2019 | Unitt | H04L 67/16 |
| 2019/0378397 A1 * | 12/2019 | Williams, II | G06N 5/046 |
| 2020/0034746 A1 * | 1/2020 | Poitras | G06F 11/302 |

\* cited by examiner

*Primary Examiner* — Suraj M Joshi
*Assistant Examiner* — Jaren Means
(74) *Attorney, Agent, or Firm* — Perkins Coie LLP

(57) ABSTRACT

Disclosed herein are embodiments of systems, methods, and products comprises a server, which receive a request from a user's electronic client device. The server understands the intention of the user by determining an attribute associated with the request. The server further determines a sentiment value and routes the request to a call center computing system if the sentiment value satisfies a threshold; otherwise, the server determines to route the request to one of virtual assistant servers. The server selects a virtual assistant server whose subject matter best matches the attribute of the request. The server may also select a virtual assistant server based on other information, such as user's previous selection of virtual assistant servers, a time value, or a confidence value. The selected virtual assistant provides a response corresponding to the request.

20 Claims, 3 Drawing Sheets ived by a user into a virtual assistant application executing on the electronic client device; executing, by the server, a natural language processing protocol to determine a first attribute and a first sentiment value associated with the first request, the first attribute corresponding to a subject matter of the first request, and the first sentiment value corresponding to one or more phrases within the first request; when the first sentiment value satisfies a threshold, routing, by the server, the first request to a call center computing system; when the first sentiment value does not satisfy the threshold, routing, by the server, the first request to a first virtual assistant server from a plurality of virtual assistant servers, wherein the first virtual assistant server is selected based at least on one of the first attribute, the first sentiment value, and wherein each virtual assistant server is configured to at least partially satisfy requests; upon receiving a second request from the electronic client device, executing, by the server, the natural language processing protocol to determine a second attribute and a second sentiment value associated with the second request; and routing, by the server, the second request to a second virtual assistant server from the plurality of virtual assistant servers, wherein the server further transmits metadata corresponding the first request comprising at least one of the first attribute, the first sentiment value, the first request, a response to the first request, and an updated user profile to the second virtual assistant server.

METHODS AND SYSTEMS FOR VIRTUAL ASSISTANT ROUTING

CROSS-REFERENCE TO RELATED APPLICATIONS

This application claims priority to U.S. Provisional Patent Application Ser. No. 62/549,875, entitled "Methods and Systems for Virtual Assistant Routing," filed Aug. 24, 2017, which is hereby incorporated by reference in its entirety.

TECHNICAL FIELD

This application relates generally to methods and systems for routing instructions from users to a selected virtual assistant server.

BACKGROUND

A virtual assistant (VA) is an application executed by a server that provides immediate professional support, services, and skills to clients remotely. For example, Amazon's virtual assistant "Alexa" or Apple's virtual assistant "Siri" can provide cloud-based services to users' requests by mimicking real conversations. Common modes of communication and data delivery include the Internet, e-mail and phone-call conferences, online work spaces, and fax machines.

While virtual assistant systems are widely used to provide administrative or technical assistance to clients, most of the industry solutions are single platform, single provider. Single platform virtual assistant systems are generally not suitable for large organizations that provide a wide range of products and services.

In existing and conventional virtual assistant routing methods, the single platform virtual assistant server handles different instructions (e.g., different requests received from the user) covering different subject matters. However, these conventional methods and software solutions have created several shortcomings and a new set of challenges. For example, the single platform virtual assistant system may not be able to provide the client requested service in an efficient and accurate way due to a high volume of customer information of different subjects. The single platform virtual assistant method may only provide limited knowledge on certain subject matters and fail to provide the most accurate information for some other subject matters. In another example, a single-platform and static virtual assistant system may be slower and less efficient, the waiting space for the single-platform system may be limited, and the arrival rate may be state dependent. As a result, potential clients may be discouraged from entering the waiting queue when there is a long line at the time they arrive.

SUMMARY

For the aforementioned reasons, there is a need for a more accurate system and method that includes multiple virtual assistant servers with each virtual assistant server dedicated to a particular domain of knowledge. Disclosed herein may allow an analytic server to determine the subject matter of the client's request and route the request to a specific virtual assistant server that is dedicated to the domain knowledge of the subject matter. Disclosed herein are systems and methods for routing the client request to the selected virtual assistant server. In addition, the server may route the request to a call center computing system for the request requires human interactions.

In one embodiment, a computer-implemented method comprises receiving, by a server, a first request from an electronic client device, wherein the first request is inputted by a user into a virtual assistant application executing on the electronic client device; executing, by the server, a natural language processing protocol to determine a first attribute and a first sentiment value associated with the first request, the first attribute corresponding to a subject matter of the first request, and the first sentiment value corresponding to one or more phrases within the first request; when the first sentiment value satisfies a threshold, routing, by the server, the first request to a call center computing system; when the first sentiment value does not satisfy the threshold, routing, by the server, the first request to a first virtual assistant server from a plurality of virtual assistant servers, wherein the first virtual assistant server is selected based at least on one of the first attribute, the first sentiment value, and wherein each virtual assistant server is configured to at least partially satisfy requests; upon receiving a second request from the electronic client device, executing, by the server, the natural language processing protocol to determine a second attribute and a second sentiment value associated with the second request; and routing, by the server, the second request to a second virtual assistant server from the plurality of virtual assistant servers, wherein the server further transmits metadata corresponding the first request comprising at least one of the first attribute, the first sentiment value, the first request, a response to the first request, and an updated user profile to the second virtual assistant server.

In another embodiment, a system comprises an electronic client device; a plurality of virtual assistant servers; a call center computing device; a server in communication with the plurality of virtual assistant servers and the call center computing device and configured to: receive a first request from the electronic client device, wherein the first request is inputted by a user into a virtual assistant application executing on the electronic client device; execute a natural language processing protocol to determine a first attribute and a first sentiment value associated with the first request, the first attribute corresponding to a subject matter of the first request, and the first sentiment value corresponding to one or more phrases within first the request; when the first sentiment value satisfies a threshold, route the first request to the call center computing system; when the first sentiment value does not satisfy the threshold, route the first request to a first virtual assistant server from the plurality of virtual assistant servers, wherein the first virtual assistant server is selected based at least on one of the first attribute, the first sentiment value, and wherein each virtual assistant server is configured to at least partially satisfy requests; upon receiving a second request from the electronic client device, execute the natural language processing protocol to determine a second attribute and a second sentiment value associated with the second request; and route the second request to a second virtual assistant server from the plurality of virtual assistant servers, wherein the server further transmits metadata corresponding the first request comprising at least one of the first attribute, the first sentiment value, the first request, a response to the first request, and an updated user profile to the second virtual assistant server.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
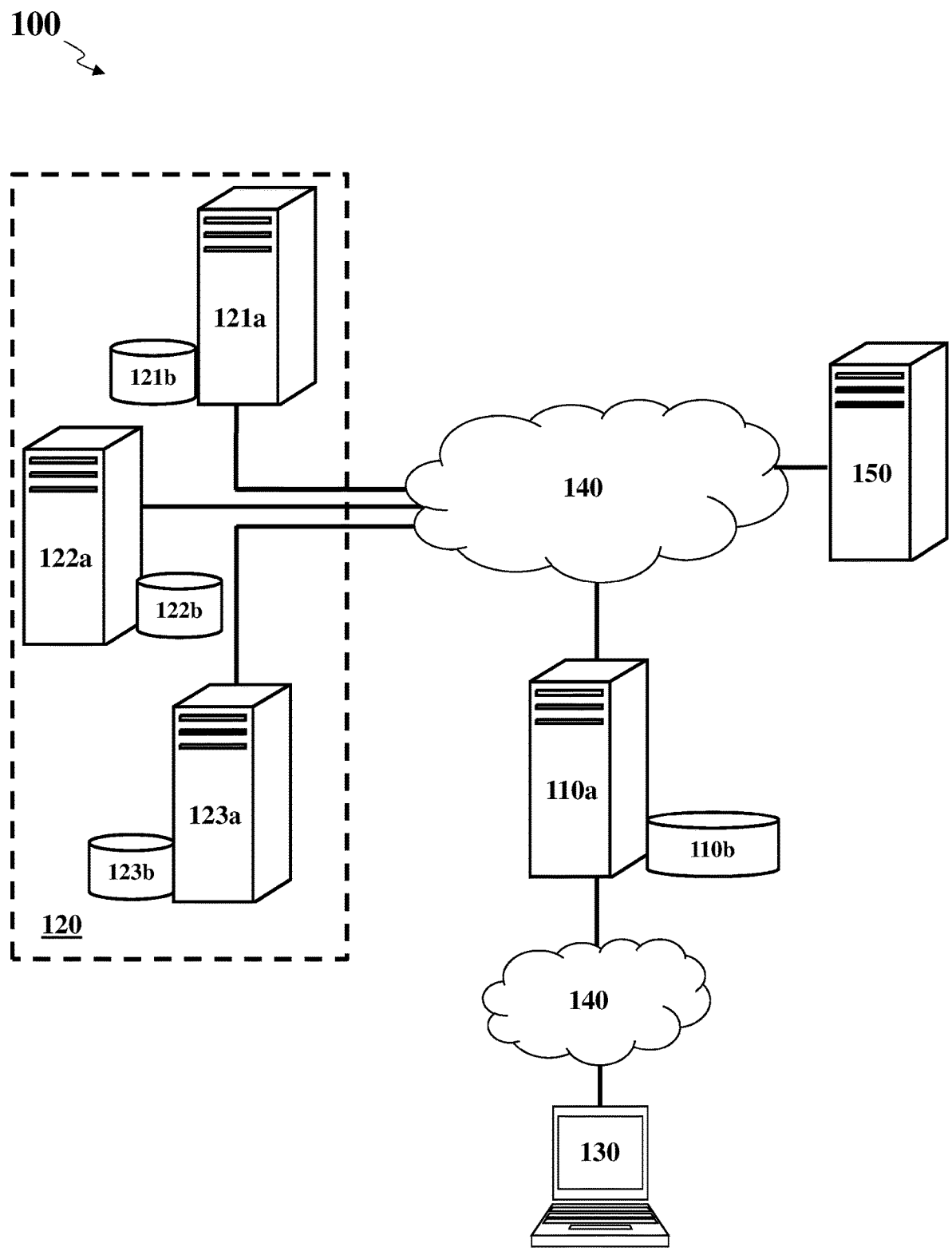
FIG. 1 illustrates a computer system for virtual assistant, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of an exemplary system 100 for a virtual assistant, according to an exemplary embodiment. The exemplary system may comprise an analytic server 110a, a system database 110b, an electronic client device 130, a call center computing system 150, and a set of virtual assistant servers 121a, 122a, 123a, with each of them having their own database 121b, 122b, 123b. The electronic client device 130 may be connected to the server 110a via hardware and software components of one or more networks 140. Further, the server 110a may be connected with the set of virtual assistant servers 121a, 122a, 123a and the call center computing system 150 via the network 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The electronic client device 130 may be any computing device allowing a participant/user to interact with analytic server 110a. The electronic client device 130 may be any computing device comprising a processor and non-transitory machine-readable storage medium allowing the electronic client device 130 to perform the various tasks and processes described herein. The examples of the computing device may include, but are not limited to, a desktop computer, a laptop, a personal digital assistant (PDA), a smartphone, a tablet computer, and the like.

The electronic client device 130 may execute an Internet browser or local application that accesses the analytic server 110a in order to issue requests or instructions. The electronic client device 130 may transmit credentials from user inputs to the analytic server 110a, from which the analytic server 110a may authenticate the user and/or determine a user role. The electronic client device 130 may comprise any number of input devices configured to receive any number of data inputs, including various types of data inputs allowing for authentication (e.g., username, passwords, certificates, and biometrics).

The electronic client device 130 may be configured to communicate with the server 110a through one or more networks 140, using wired and/or wireless communication capabilities. In operation, the electronic client device 130 may execute a virtual assistant program, which may include a user interface that renders an interactive layout, schematic, or other elements for the user to input a request. For example, the user interface may include a text based interface allowing the user to enter manual commands. The request is sent by the electronic client device 130 to a server 110a through the network 140.

An analytic server 110a may be any computing device comprising a processor and other computing hardware and software components, configured to process the requests received from the electronic client device 130. The server 110a may be logically and physically organized within the same or different devices or structures, and may be distributed across any number of physical structures and locations (e.g., cabinets, rooms, buildings, cities). The server 110a may comprise, or may be in networked-communication with a system database 110b.

Upon the server 110a receiving the user's request, the server 110a may execute one or more component software modules to decide which computing system is most suitable for responding to the request. Specifically, the server 110a may first decide whether the requests should be processed by a call center computing system 150 or a regular virtual assistant server 121a, 122a, 123a. If a regular virtual assistant is more suitable, the server may further decide which virtual assistant servers 121a, 122a, 123a is most suitable for the request. And the server 110a may then route the request to a selected virtual assistant server 121a, 122a, 123a through one or more networks 140. To decide between the call center computing system 150 and virtual assistant servers 121a, 122a, 123a, and select the suitable virtual assistant server 121a, 122a, 123a, the server 110a may query the system database 110b.

A system database 110b may be any non-transitory machine-readable media configured to store data, including user data and virtual assistant server data. For example, the user data may include user identification, user credentials, and use's pertinent information such as past requests, selected virtual assistant servers, sentiment value, chat transcripts, requests, and subject matters of requests. The virtual assistant server data may include the subject matter associated with each virtual assistant server, a pre-determined list of words for each subject matter, and feedback information from each virtual assistant server such as a time value and/or a confidence value. The database may include other related data that may be used to help the server 110a select the call center computing system 150 or a suitable virtual assistant server 121a, 122a, 123a and route requests of electronic client devices 130 to the selected system or server through the network 140.

The set of virtual assistant servers 121a, 122a, 123a may be any computing device or backend comprising a processor and other computing hardware and software components. Each virtual assistant server 121a, 122a, 123a may be associated with a subject matter or a domain of knowledge.

In some embodiments, the subject matter or knowledge domain may be coarse-grained segment in a high level. For example, one virtual assistant server may be associated with banking business; another virtual assistant server may be associated with insurance business. In some other embodiments, the subject matter or knowledge domain may be a fine-grained segment in activity level. For example, one virtual assistant server may be associated with bill pay activity; another virtual assistant server may be associated with fund transfer activity. Each virtual assistant server may be configured to respond to one or more requests of their own subject matter. Each virtual assistant server 121a, 122a, 123a may comprise, or may be in networked-communication with a database 121b, 122b, 123b. Each database stores service data of their own subject matter and other related data of the requests and clients associated with the subject matter. The virtual assistant servers 121a, 122a, 123a may query their databases 121b, 122b, 123b to respond to one or more requests of a specific subject matter.

The call center computing system 150 may be a system configured to respond to requests that require human interactions other than regular virtual assistant servers 121a, 122a, 123a. For example, if the user is angry or disgruntled, the request may be routed straight to the call center computing system 150 where a service representative may directly chat and/or interface with the user.

Figure 2:
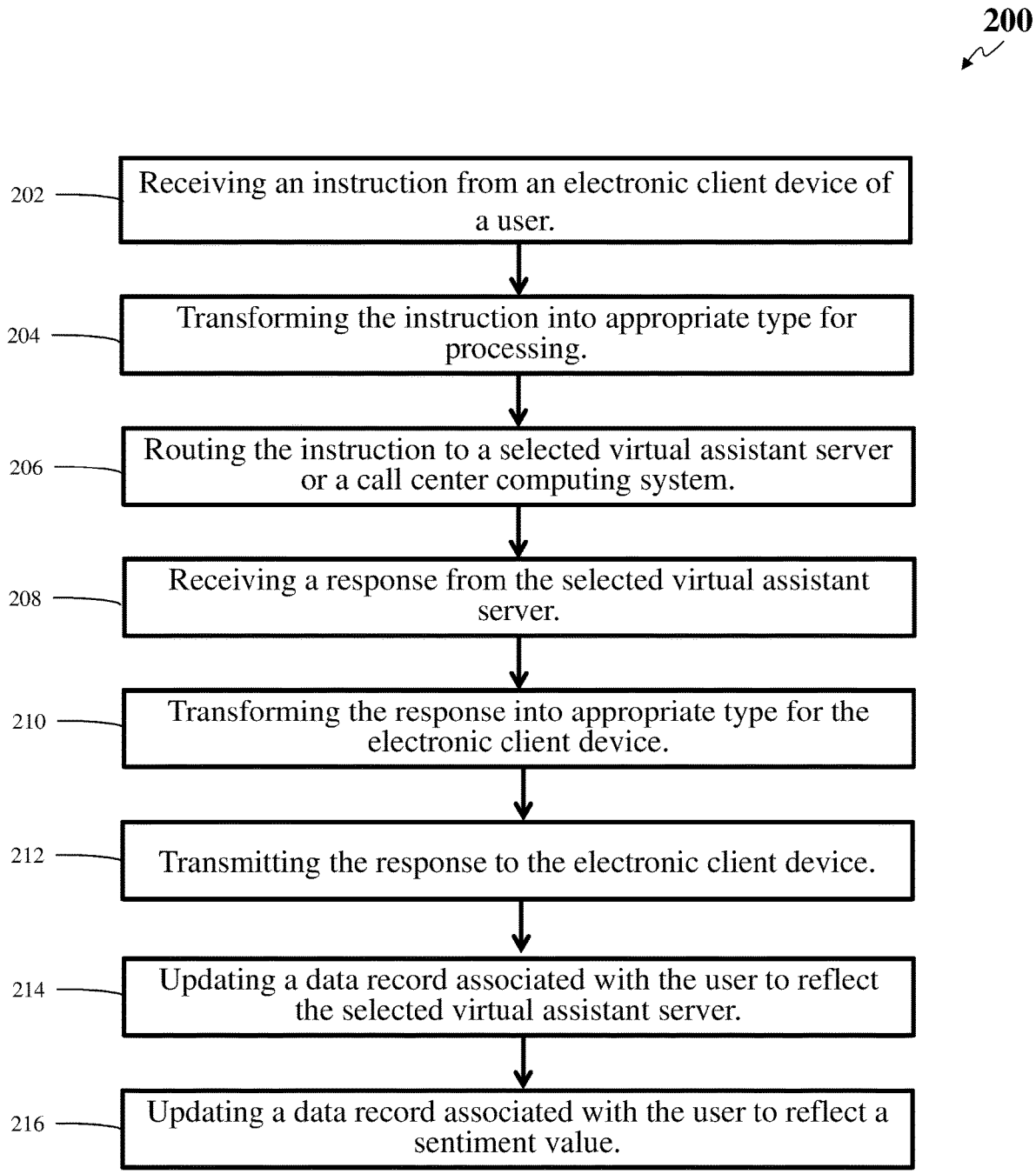
FIG. 2 illustrates a flowchart depicting operational steps for processing a request, according to an exemplary embodiment.

FIG. 2 illustrates execution of an exemplary method 200 for processing a request, according to an exemplary embodiment. Other embodiments may comprise additional or alternative steps, or may omit some steps altogether.

At step 202, the analytic server may receive a request from an electronic client device of a user. The analytic server may receive the request when the user is interacting with a chatbot. A chatbot (also known as a talkbot, chatterbot, Bot, chatterbox, Artificial Conversational Entity) can be a computer program that conducts a conversation with a user via auditory (e.g., from an oral or verbal command) or textual methods on a user interface (e.g., graphical user interface or audio-based interface). For example, the user may speak or verbally request a service or a modification to a user profile. Such programs are often designed to convincingly simulate how a human would behave as a conversational partner. Chatbots are typically used in dialog systems for various practical purposes including customer service or information acquisition. Some chatbots may use sophisticated natural language processing systems, many simpler systems may scan for keywords within the input, then pull a reply with the most matching keywords, or the most similar wording pattern, from a database.

In one embodiment, the analytic server may receive multiple requests from the same user or different users. The requests may be of the same subject matter or different subject matters. In one embodiment, the electronic client device may execute a virtual assistant program/application to allow the user to input a request or display the requested information to the user. The user may input a request of different types or formats. For example, the request may be or converted into a type of rich text or auditory input (e.g., WAV, MP3, WMA, AU, and the like) or any other format the user's electronic client device supports. The user may choose to input a request in one type or any combination of different types based on his/her preference. For example, the user may input a request that includes texts of different fonts or pictures (e.g., BMP, GIF, JPG or PNG). Most word processing software supports rich text file format and makes it a "common format" between otherwise incompatible word processing software and operating systems. There may be subtle differences between different versions of the rich text format specification. Nevertheless, the rich text format may be consistent enough from computer to computer to be considered highly portable and acceptable for cross-platform use.

In operation, the user may open a website in an Internet browser or a local application on a mobile device configured to receive an instruction or a request from the user. The user may first enter credential information such as username, password, certificate, and biometrics. The client device then transmits the user inputs to the analytic server for authentication. The analytics server may access a system database configured to store user credentials, which the analytics server may be configured to reference in order to determine whether a set of entered credentials (purportedly authenticating the user) match an appropriate set of credentials that identify and authenticate the user. After the analytic server authenticates the user and/or determines the user's role, the analytic server may generate and serve webpages to a client device. The webpages may include the virtual assistant program user interface for the user to input requests. In a conversational client layer, the analytic server may receive different requests from the user through the electronic client device. Different electronic client devices may have different input/output capabilities along with various ways of implementing solutions. Some electronic devices have audio input and output, while others may accept and reply with text, audio, rich media content and/or some combination thereof. For example, the user interface may include a text-based interface where the user can manually type requests and interact with a virtual assistant by using a keyboard. In another example, the user interface may include an audio-based interface where the user can issue requests by talking to a virtual assistant.

The website or application user interface configured to receive a request may include Facebook Messenger, short message service (SMS), Amazon Alexa/Echo, Google Assistant, in-app, Apple Siri, Microsoft Cortana, interactive voice response (IVR), Unity, an intelligent personal assistant application or device, and the like.

In some embodiments, the SMS interface may support raw text, hyperlinks for navigation, emojis (or other ideograms or emoticons), and images. For example, Alexa may convert speech to text and may optionally support both speech and text models and may convert them to intent/slotting or pure text. The intent/slotting may declare the set of intents the service can accept and process. Alexa currently only supports audio as the user interface. Google Assistant may support Google clients to include Home, Allo, as well as the electronic client device's own interface. The electronic client device may convert speech to text and may optionally support both speech and text models and may convert them to intent/slotting or pure text. Depending upon the electronic client device, the Google Assistant user interface may support audio/speech to text (STT)/text to speech (TTS), textual prompts, rich text content and navigation through web links. In-app is a robust virtual assistant client user interface. The user interface features may include audio/STT/TTS, textual prompts, rich text displays including images and navigation to both web and native user interface. In addition, an in-app interface may dynamically adjust the presentment or interface features based upon the user's environment, user disabilities or other external devices connected to the electronic client device. Siri may control the intents and slots of after understanding the requests, and integrate the intents and slots with the virtual assistants to process the requests. IVR may only support audio input and output. Unity may only support audio input and output.

At step 204, the analytic server may transform the request into appropriate type for processing. In a transformation layer, the analytic server may translate the communication protocols from various clients into a single set of known application programming interfaces (APIs) for processing. While the request received may be in different types, the analytic server may not be able to understand or process all of the types. The analytic server may need to transform the input to a specific computer readable type (e.g., PDF, DOC, DOCX, XLS, and the like). For example, the electronic client device supports audio, and the request inputted by the user is audio, but the server may only understand text. In this step, the server may transform the audio to text for further processing. In a standardized API layer, the analytic server may translate the requests to a standard format, including audio translation, emoji translation, language translation, and image translation. The audio translation may convert the audio input (e.g., audio file or stream) of speech to text. The emoji translation may convert any emojis in the input into the lexical representation. The analytic server may further pass along the translated emojis in a separate object for further intent and sentiment interpretation. The language translation may translate many languages to one or one language to many, depending on the user's requirements. The image translation may convert any images in the input into the lexical representation.

In some configurations, after the user verbally input the request (e.g., speaks the request), the client device may transform the audio input into a message/file in a standard format, including audio translation, emoji translation, language translation, and image translation. Moreover, the electronic client device may have an API running on the device to transmit the transformed file in the standard format to the analytic server. For instance, upon receiving the auditory request from the user, the electronic client device may use the above-mentioned methodology to create a file corresponding to the response (e.g., transform the auditory request into a machine-readable file). Subsequently, the analytic server may retrieve the file using an API executing on the electronic client device. The machine-readable file may be in a format that is compatible and readable by the analytic server.

At step 206, the analytic server may route the request to a selected virtual assistant server or call center computing system. In some embodiments, the call center computing device may be another virtual assistant server. In a routing layer, the analytic server may deliver the incoming request or request to the most appropriate virtual assistant. The analytic server may first understand the request. More specifically, the analytic server may determine the subject matter of the request and the sentiment value of the user. The analytic server may further query the user's past requests. Based on such information, the analytic server may decide if the call center computing system or a virtual assistant server is more suitable for the request and which virtual assistant server is most suitable. For example, a large organization may provide different services including banking services, insurance services, and investment services. A virtual assistant server may be designated to only one type of service. The analytic server may route the request to one or more selected virtual assistant servers based on which service the user is requesting. In some embodiments, one request from a user may necessitate multiple responses from one or more virtual assistant servers or the call center computing system. For example, in an event-based system, one request may include different components corresponding to different events. The analytic server may decouple the relationships between the components, produce the event of each portion, and process each event accordingly. The analytic server may route the different events to one or more virtual assistant servers or the call center computing system. Each virtual assistant server is configured to at least partially satisfy the request. The analytic server may receive any number of responses to the single request.

Figure 3:
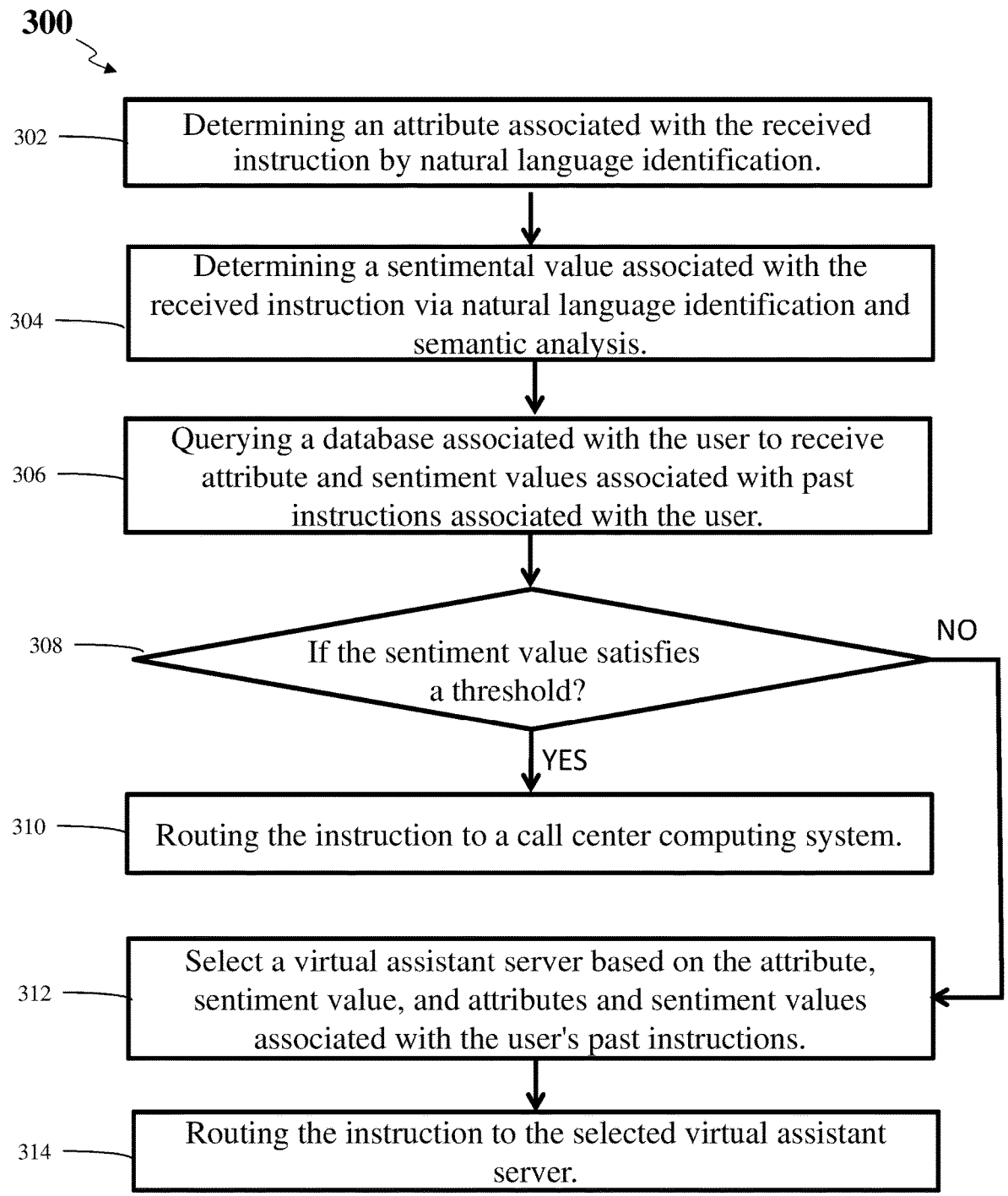
FIG. 3 illustrates a flowchart depicting operational steps for routing a request, according to an exemplary embodiment.

The methods utilized by the analytic server to process each request or event are described in more detail in FIG. 3. Furthermore, the analytic server may check the availability of the virtual assistant servers and call center computing system to determine if the request needs to be rerouted.

At step 208, the analytic server may receive a response from the selected virtual assistant server. After the most suitable virtual assistant server receives the request, the virtual assistant server may query its database, provide a response to the request, and return the response to the analytic server through a network. The analytic server may receive the response in a specific type. In an intelligent provider layer, the virtual assistant servers may interpret the request from the analytic server and determine the most appropriate response. The virtual assistant servers may use a variety of techniques to formulate response. The variety of techniques may include but not limited to direct/scripted dialogue, knowledge representation, search, or a combination of these methods. The virtual assistant servers may also allow for the integration of external data to augment the request and subsequent response.

The analytic server may include a connection manager that manages connectivity to different virtual assistant servers for concurrent requests. For example, after the analytic server routes the request to a selected virtual assistant server, the connection manager of the analytic server may wait for a timeout period to ensure timely response. If the analytic server does not receive a response after the timeout period elapses, then the connection manager of the analytic server may reroute the request or route the request to the call center computing system.

At step 210, the analytic server may transform the response into appropriate type for the electronic client device. The received response may be in a different type than the type the user's electronic client device supports. For example, the received response may be text, but the user's device may only support audio. In this step, the analytic server may transform the text to audio to better serve the user.

At step 212, the analytic server may transmit the response to the electronic client device. The virtual assistant program associated with the electronic client device may display the response in a format the client device supports. For example, the transformed audio from the previous step is played on the electronic client device.

At step 214, the analytic server may update a data record associated with the user to reflect the selected virtual assistant server. The analytic server may maintain certain data records associated with the user in its database. The data records may include the past requests of the user, the selected virtual assistant servers for the past requests, and the sentiment values of the past requests. The data record may include any other information reflecting the user's past behavior. The analytic server may update the data records whenever a new request is processed to reflect the selected virtual assistant server for the new request.

At step 216, the analytic server may update a data record associated with the user to reflect a sentiment value. After a new request is processed, the analytic server may update the data records associated with the user by adding a new record for the new request to reflect the sentiment value.

FIG. 3 illustrates execution of an exemplary method 300 for routing a request, according to an exemplary embodiment. Other embodiments may comprise additional or alternative steps, or may omit some steps altogether.

At step 302, the analytic server may determine an attribute associated with the received request by using natural language identification or natural language processing protocols. Upon receiving a request and transforming it to appropriate computer readable type, the analytic server may try to determine a subject matter for and categorize the request by natural language identification. Specifically, the analytic server may determine an attribute associated with the request. The attribute may be a keyword from the request or a high level subject matter or topic related with the request. By determining an attribute, the analytic server may determine what information the user is requesting. The analytic server may determine an attribute by any other algorithms with similar functions as natural language identification.

In some implementations, the analytic server may include a database or a reference table storing a pre-determined list of words for each subject matter. For example, for the subject matter of "bank," the server may include a list of "payment," "loan," "deposits," "saving account," "checking account." etc. To determine the attribute of a request, the analytic server may parse the words, identify the words, and check the identified words against a pre-determined list of words. For example, if the word "payment" is in the request, the analytic server may determine this request is regarding bank information.

At step 304, the analytic server may determine a sentiment value associated with the received request via natural language identification or natural language processing protocols and semantic analysis. The sentiment value may reflect an attitude of the user with respect to the request. The attitude may be emotional reaction to an event or a satisfactory level of a response. The analytic server may determine a sentiment value by any other algorithms with similar functions as natural language identification and semantic analysis.

In some implementations, the analytic server may determine the sentiment value based on one or more phrases within the request by looking at request words in isolation, giving positive points for positive words and negative points for negative words based on a sentiment database, and then summing up the points. The sentiment value may represent the user's feelings or satisfactory level of the virtual assistant service. A higher sentiment value represents feelings that are more positive, a lower sentiment value represents feelings that are more negative. For example, when the sentiment value is too negative and below a threshold, the sentiment value may represent anger, frustration, anxiety, resentment, depression, or a spiral downward.

At step 306, the analytic server may query a database associated with the user to receive attribute and sentiment values associate with past requests associated with the user. The database associated with the user may keep data records of the user's past requests. For example, if the user has used the chatbot before, all the pertinent information will be store in an internal database including the chat transcript, the user identification, request, sentiment value, subject matter, selected virtual assistant server and the like. By querying the database, the analytic server may learn the user's history behavior pattern, and may make better decisions based on the user's history behavior.

At step 308, the analytic server may determine if the sentiment value satisfies a threshold. If the sentiment value satisfies a threshold, the process goes to step 310; otherwise, the process goes to step 312. The threshold may be a value configured based on the user's history sentiment values. The threshold may be a pre-determined value initialized by the server for all users. Alternatively, the threshold may be a value set by each user. It may be different for different users and/or for different services.

For example, for high value customers, the threshold may be relatively higher than regular customers. When the analytic server determines the user is getting negative, the sentiment value starts dropping and can easily decrease below a relatively high threshold. The server may route the request to a call center computing system for direct human interaction. So that the high value customer can be given a priority and better served by setting a higher threshold.

As another example, the user may set different thresholds for different services higher than banking services. Users with health problems may take insurance service as a priority and set a higher threshold for insurance services. Users with financial problems may take banking services as a priority and set a higher threshold for banking services.

At step 310, the analytic server may route the request to a call center computing system. The call center computing system may comprise human service representatives. As the sentiment value satisfies a threshold, the user may be in an urgent or unusual situation and have intense feelings, for example, the user may be angry or disgruntled. In this case, it may be better to route the user to a customer service representative instead of allowing a machine to interact with the user directly. The analytic server may route the request to the call center, where a service representative may directly chat and/or interface with the user to provide responses.

At step 312, the analytic server may select a virtual assistant server based on the attribute, sentiment value, and attributes and sentiment values associated with the user's past request. When the analytic server decides the sentiment value does not satisfy a threshold, the analysis server decides a regular virtual assistant server is able to process the request. While there are a set of virtual assistant servers, the analytic server may select a most suitable one based on the attribute of the request, the attributes associated with the user's past requests. In some embodiments, the analytic server may select a virtual assistant based on natural language identification method, serial method, shotgun method, machine learning method, or combination of the above methods.

In natural language identification method, the analytic server may query a database that includes a pre-determined list of words for each subject matter associated with the virtual assistant servers. If the attribute of a request matches one of the pre-determined list of words for a certain subject matter, the analytic server decides the virtual assistant server associated with this subject matter is the most suitable one. A request may concern multiple subject matters in different proportions. For example, the analytic server may determine that a request is 10% about "banking" and 90% about "investing," because there are nine times more "investing" words than "banking" words. The analytic server may calculate a similarity value between the attribute and each subject matter based on the statistics of the words, and select the virtual assistant server whose subject matter has the highest similarity value. In this example, the analytic server may determine the similarity value for bank is 1, and the similarity value for investment is 9. Thus, the analytic server may select a virtual assistant server associated with the subject matter of investments. Other machine learning and natural language processing algorithms/protocols may be utilized to discover latent semantic structures of a request and determine the topic or subject matter of the request.

In serial method, the analytic server may send the request to a selected virtual assistant based on the subject matter and determine if the response is suitable. If not, the analytic server may select another virtual assistant and send the request. The analytic server may repeat this process for a fixed time period or until a suitable response is found.

In shotgun method, the analytic server may send the request to each virtual assistant server, and select the most suitable one based on their feedbacks, such as a time value or a confidence value.

In one embodiment, the analytic server may select the virtual assistant server based on a time value. The analytic server may shotgun the request to all of the virtual assistant servers one by one or simultaneously and receive a response from each of them. Each response is associated with a time value. The time values may reflect the time consumed for processing the request and providing a response on each virtual assistant server. The analytic server may select the virtual assistant server with the shortest time value. In other words, the analytic server may select the virtual assistant server that can process the request most efficiently.

In some implementations, the analytic server may transmit the request to a random virtual assistant server. If the time value associated with this virtual assistant server does not satisfy a certain threshold, the analytic server may transmit the request to another random virtual assistant server, until a time value satisfies the threshold, the analytic server may select the virtual assistant server whose time value satisfies the threshold.

In another embodiment, the may select the virtual assistant server based on a confidence value. The analytic server may shotgun the request to all of the virtual assistant servers one by one or simultaneously and receive a response from each of them. Each response is associated with a confidence value. The confidence value may reflect how confident the virtual assistant server is about the response to the request. The confidence value may represent the probability of the response including the correct answer to the user's request. The confidence value may include the relevance level and the accuracy level of the response. The analytic server may select the virtual assistant server with the highest confidence value. In other words, the analytic server may select the virtual assistant server that can process the request most accurately.

In some implementations, the analytic server may transmit the request to a random virtual assistant server. If the confidence value associated with this virtual assistant server does not satisfy a certain threshold, the analytic server may transmit the request to another random virtual assistant server, until a confidence value satisfies the threshold. The analytic server may select the virtual assistant server whose confidence value satisfies the threshold.

In some embodiments, the user may provide feedback and commentary on the responses from different virtual assistant servers. The analytic server may receive the feedback to learn and understand correct and incorrect responses to improve future routing decisions. In addition, the virtual assistant servers may tie a scoring system to the conversational history based on the user's feedback that may over time produce the confidence value.

In operation, if more than one virtual assistant servers are picked, the analytic server may select one virtual assistant server based on a round robin algorithm. Each virtual assistant server may take an equal portion of the requests and provide responses in circular order.

In machine learning method, the analytic server may use the knowledge of previous selection of virtual assistants to process new requests more efficiently. For example, the analytic server may determine a previous selection of virtual assistant servers associated with the user. In addition, the analytic server may determine that the user always asks a certain topic based on the attributes associated with the user's past requests. Moreover, the analytic server may determine one virtual assistant server that is more matched based on the user's past requests. The machine learning method may require a machine-learning algorithm, such as a neural network, to determine the most suitable virtual assistant server. Whenever an unknown request shows up, the analytic server may default to the shotgun method where the request is routed to each virtual assistant server. After the virtual assistant servers return the responses and corresponding confidence values, the analytic server may add the responses and corresponding confidence values into a list of requests/responses in a local database, which may serve as training data for the machine learning algorithm. When a similar request shows up, the machine learning algorithm may make a better decision on which virtual assistant server to choose, for example, the machine learning algorithm may choose the virtual assistant server with the highest confidence value. In addition, the list of requests may be used to retrain the machine learning algorithm from scratch by shot-gunning every request, or a subset of the requests to obtain a new list of request/response pairs. Furthermore, the initial list of the requests may be augmented by any number of additional requests not seen before.

In combination of different methods, the analytic server may combine the aforementioned methods. For example, the analytic server may use the natural language identification method to select the top three virtual assistants for a given request and then use the shotgun method or serial method to obtain the best response.

In some embodiments, the analytic server may transmit the request to more than one selected virtual assistant server for the user. The analytic server may include a context manager. When more than one virtual assistant servers are needed, each virtual assistant server may keep their own context and state and other relevant information associated with the user. When there is a need to switch among different virtual assistant servers, the context manager may keep track of conversational state across different requests and inject the relevant data to enable augmentation on subsequent requests. For example, the context manager may comprise a context database that stores the metadata of the previous interaction including topics and attributes of the request, the sentiment value, the actual request, the response from the previous interaction, and an updated user profile. The updated user profile may reflect the newest state of the user profile after the previous request. For example, in a previous request, the user may request to transfer money from a bank account. The updated user profile may reflect the new account balance after the transfer. The context manager may query the context database, determine and embed such metadata to the subsequent requests. In some embodiments, the context manager may not only keep track of the conversational context but also external system context. The external system context may comprise information outside the scope of the conversation. For example, the external system context may include if the user is using a website, what is the user searching for in a search engine, has the user called in recently, and any other information relevant to the user's needs. By considering the conversational and external system context, the analytic server may better understand the user's needs and provide personalization services based on the user's needs. For example, based on the fact that the user has called in three times recently, the analytic server may determine that the user's needs are not satisfied by the chatbot, and may escalate the user to the call center computing system for real person service.

For example, a user may request some "bank" information, and then request some "investment" service. The virtual assistant server with subject matter "bank" may provide responses first. At the time the process switches to virtual assistant server with subject matter "investment" to provide further service, the context manager may provide the local "bank" context and state to the "investment" virtual assistant server, so that the "investment" virtual assistant server may provide service and response based on the previous "bank" information without having the user input the previous requests again.

In some embodiments, the analytic server may include a session manager that allows conversations to be grouped together between requests and across clients. Specifically, the session manager may tie requests and responses together into a logical group to enable context filling. In addition, the session manager may enable an abstract layer that ties sessions exist at the conversational client layer and an intelligent provider layer together.

At step 314, the analytic server may route the request to the selected virtual assistant server. As the selected virtual assistant server is the most suitable server for providing the requested service, the selected virtual assistant server may return responses in an efficient and accurate way.

Example

A user initiates an application associated with the analytic server on a virtual assistant device (e.g., an electronic device configured to receive auditory commands by the user). The user then inputs an auditory request to transfer $1000 from his savings account to his checking account. For instance, the user verbally inputs (e.g., speaks) a request. The analytic server then receives the request from the virtual assistant device (or the application executing on the virtual assistant device). The analytic server then executes a natural language processing protocol and identifies the subject matter of the request (i.e., banking transfer) and the sentiment value (i.e., normal). The analytic server then queries a referencing table (stored in an internal or external database) and identifies a virtual assistant server configured to satisfy requests corresponding to subject matter similar or associated with the user's request. The analytic server then transfers the user's request to the identified virtual assistant server. When the virtual assistant server satisfies the user's request, the analytic server receives a response from the virtual assistant server and transmits the response to the user's virtual assistant device. The user then inputs a second request to transfer $500 from his checking account to another account. Using the above-mentioned methodology, the analytic server identifies a second virtual assistant server and transmits the second request to the second virtual assistant server. The analytic server also transmits metadata comprising the first request, the first attribute (e.g., subject matter), the first sentiment value, and/or data corresponding to the user's updated profile (e.g., an updated balance of the user's accounts) to the second virtual assistant server.

Methods and systems disclosed herein can provide technical advantages over conventional virtual assistant technology. For instance, by routing requests to different virtual assistant servers, the analytic server ensures that each virtual assistant server is not overloaded with requests. The analytic server further ensures that each request is satisfied via a virtual assistant server that is capable of fulfilling the user's request. Furthermore, by transmitting the above-mentioned metadata (e.g., data associated with the first request) the analytic server may reduce the processing power needed by the second virtual assistant server to fulfill the second request. In this way, the second virtual assistant server will have the latest and the most updated user data, which eliminates the need for the second virtual assistant server to calculate/retrieve said updated or latest user data. Thereby the above-described method reduces the processing power used by the second virtual assistant server.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a server, a first request from an electronic client device, wherein the first request is inputted by a user into a virtual assistant application executing on the electronic client device;
   executing, by the server, a natural language processing protocol to determine a first attribute and a first sentiment value associated with the first request, the first attribute corresponding to a subject matter of the first request, and the first sentiment value corresponding to one or more phrases within the first request;
   determining a sentiment threshold, based on the user and the subject matter, that specifies a sentiment level for differentiating between call center or virtual assistant destinations for one or more requests;
   when the first sentiment value satisfies the sentiment threshold, routing, by the server, the first request to a call center computing system;
   when the first sentiment value does not satisfy the sentiment threshold, routing, by the server, the first request to a first virtual assistant server from a plurality of virtual assistant servers,
      wherein the first virtual assistant server is selected based at least on one of the first attribute or the first sentiment value, and
      wherein each virtual assistant server is configured to at least partially satisfy requests;
   updating a user profile to indicate the selected first virtual assistant server;
   upon receiving a second request from the electronic client device:
      determining, by the server, external context metadata of the user, wherein the external context metadata of the user comprises information outside the second request;
      executing, by the server, the natural language processing protocol to determine a second attribute and a second sentiment value associated with the second request; and
      routing, by the server, the second request to a second virtual assistant server from the plurality of virtual assistant servers or the call center computing system based on the external context metadata of the user, the second attribute and the second sentiment value,
         wherein the server further transmits the external context metadata of the user, metadata corresponding to the first request comprising:
            at least one of the first attribute or the first sentiment value,
            the first request, a response to the first request, and the updated user profile to the second virtual assistant server or the call center computing system.

2. The method of claim 1, wherein the requests are received in response to the user's auditory input.

3. The method of claim 1, wherein the selection of the virtual assistant server comprises a round robin selection.

4. The method of claim 1, wherein the selection of the virtual assistant server comprises a random selection.

5. The method of claim 1, wherein the selection of the virtual assistant server comprises a shotgun method.

6. The method of claim 1, wherein the selection of the virtual assistant server comprises a serial method.

7. The method of claim 1, further comprising:
   selecting, by the server, a virtual assistant server based on a previous selection of virtual assistant servers associated with the user by utilizing machine learning algorithms.

8. The method of claim 1, further comprising:
   transforming, by the server, the received request from the electronic client device into computer readable type for the server; and
   transforming, by the server, the response from the selected virtual assistant server into client device readable type for the electronic client device.

9. The method of claim 1, wherein the server selects the selected virtual assistant server based on at least one of a shortest time value, a highest confidence value, and a highest similarity value.

10. The method of claim 1, further comprising:
adjusting the sentiment threshold for the user, wherein the sentiment threshold is configured based on historical sentiment values for the user.

11. A system comprising:
an electronic client device;
a plurality of virtual assistant servers;
a call center computing device;
a server in communication with the plurality of virtual assistant servers and the call center computing device and configured to:
receive a first request from the electronic client device, wherein the first request is inputted by a user into a virtual assistant application executing on the electronic client device;
execute a natural language processing protocol to determine a first attribute and a first sentiment value associated with the first request, the first attribute corresponding to a subject matter of the first request, and the first sentiment value corresponding to one or more phrases within the first request;
determine a sentiment threshold, based on the user and the subject matter, that specifies a sentiment level for differentiating between call center or virtual assistant destinations for one or more requests;
when the first sentiment value satisfies the sentiment threshold, route the first request to the call center computing system;
when the first sentiment value does not satisfy the sentiment threshold, route the first request to a first virtual assistant server from the plurality of virtual assistant servers,
wherein the first virtual assistant server is selected based at least on one of the first attribute or the first sentiment value, and
wherein each virtual assistant server is configured to at least partially satisfy requests;
updating a user profile to indicate the selected first virtual assistant server;
upon receiving a second request from the electronic client device:
determine, by the server, external context metadata of the user, wherein the external context metadata of the user comprises information outside the second request;
execute the natural language processing protocol to determine a second attribute and a second sentiment value associated with the second request; and
route the second request to a second virtual assistant server from the plurality of virtual assistant servers or the call center computing device based on the external context metadata of the user, the second attribute and the second sentiment value,
wherein the server further transmits the external context metadata of the user, metadata corresponding to the first request comprising:
at least one of the first attribute or the first sentiment value, the first request,
a response to the first request, and
the updated user profile to the second virtual assistant server or to the call center computing device.

12. The system of claim 11, wherein the requests are received in response to the user's auditory input.

13. The system of claim 11, wherein the selection of the virtual assistant server comprises a round robin selection.

14. The system of claim 11, wherein the selection of the virtual assistant server comprises a random selection.

15. The system of claim 11, wherein the selection of the virtual assistant server comprises a shotgun method.

16. The system of claim 11, wherein the selection of the virtual assistant server comprises a serial method.

17. The system of claim 11, wherein the server is further configured to:
select a virtual assistant server based on a previous selection of virtual assistant servers associated with the user by utilizing machine learning algorithms.

18. The system of claim 11, wherein the server is further configured to:
transform the received request from the electronic client device into computer readable type for the server; and
transform the response from the selected virtual assistant server into client device readable type for the electronic client device.

19. The system of claim 11, wherein the server selects the selected virtual assistant server based on at least one of a shortest time value, a highest confidence value, and a highest similarity value.

20. The system of claim 11, wherein the server is further configured to adjust the sentiment threshold for the user, wherein the sentiment threshold is configured based on historical sentiment values for the user.

* * * * *